United States Patent
Huang et al.

(10) Patent No.: US 11,050,586 B2
(45) Date of Patent: Jun. 29, 2021

(54) INTER-CLOUD COMMUNICATION METHOD AND RELATED DEVICE, AND INTER-CLOUD COMMUNICATION CONFIGURATION METHOD AND RELATED DEVICE

(71) Applicant: Huawei Technologies Co., Ltd., Shenzhen (CN)

(72) Inventors: Denghui Huang, Hangzhou (CN); Yi Huang, Shenzhen (CN); Yili Liang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/365,103

(22) Filed: Mar. 26, 2019

(65) Prior Publication Data

US 2019/0222440 A1 Jul. 18, 2019

Related U.S. Application Data

(63) Continuation of application No. PCT/CN2017/095911, filed on Aug. 4, 2017.

(30) Foreign Application Priority Data

Sep. 26, 2016 (CN) .......................... 201610851070.7

(51) Int. Cl.
*H04L 12/46* (2006.01)
*H04L 12/715* (2013.01)
(Continued)

(52) U.S. Cl.
CPC ...... *H04L 12/4625* (2013.01); *G06F 9/45533* (2013.01); *H04L 12/4633* (2013.01);
(Continued)

(58) Field of Classification Search
CPC ............ H04L 12/4625; H04L 12/4633; H04L 12/4641; H04L 45/04; H04L 49/258;
(Continued)

(56) References Cited

U.S. PATENT DOCUMENTS 9,755,965 B1 * 9/2017 Yadav ................. H04L 41/0806
2010/0287548 A1   11/2010 Zhou et al.
(Continued)

FOREIGN PATENT DOCUMENTS

CN        103368807 A      10/2013
CN        103814554 A       5/2014
(Continued)

OTHER PUBLICATIONS

Mahalingam, M., et al., "Virtual eXtensible Local Area Network (VXLAN) : A Framework for Overlaying Virtualized Layer 2 Networks over Layer 3 Networks," XP015104444, RFC 7348, Aug. 27, 2014, 22 pages.
(Continued)

*Primary Examiner* — Tejis Daya
(74) *Attorney, Agent, or Firm* — Conley Rose, P.C.

(57) ABSTRACT

An inter-cloud communication method, used to implement communication between two clouds, where virtual machines belonging to a same virtual network are created in the two clouds. A receive end cloud uses a gateway node as an entrance to external communication, and all data packets to be sent to a virtual machine in the receive end cloud are sent to the gateway node, thereby preventing a location change of the virtual machine from affecting a transmit end cloud. In addition, the data packet only needs to pass through the gateway node in the receive end cloud and a computing node on which the virtual machine that receives the data packet is located, that is, the data packet only needs two hops to reach
(Continued)

a destination, thereby shortening a communication path, and improving inter-cloud communication efficiency.

20 Claims, 10 Drawing Sheets

(51) Int. Cl.
  *H04L 12/947* (2013.01)
  *H04L 29/06* (2006.01)
  *H04L 12/705* (2013.01)
  *G06F 9/455* (2018.01)

(52) U.S. Cl.
  CPC .......... *H04L 12/4641* (2013.01); *H04L 45/04* (2013.01); *H04L 45/18* (2013.01); *H04L 49/258* (2013.01); *H04L 63/0272* (2013.01); *H04L 2012/4629* (2013.01)

(58) Field of Classification Search
  CPC ............... H04L 63/0272; H04L 45/18; H04L 2012/4629; H04L 12/66; H04L 67/10; G06F 9/45533; G06F 9/54
  See application file for complete search history.

(56) References Cited

U.S. PATENT DOCUMENTS

| | | | |
|---|---|---|---|
| 2013/0266019 A1* | 10/2013 | Qu | H04L 49/70 370/395.53 |
| 2013/0268643 A1 | 10/2013 | Chang et al. | |
| 2013/0318219 A1* | 11/2013 | Kancherla | H04L 41/0806 709/222 |
| 2014/0052877 A1* | 2/2014 | Mao | H04L 12/4641 709/245 |
| 2014/0059537 A1* | 2/2014 | Kamble | H04L 12/18 718/1 |
| 2014/0156818 A1* | 6/2014 | Hunt | H04L 67/10 709/222 |
| 2014/0366155 A1* | 12/2014 | Chang | H04L 67/1097 726/27 |
| 2014/0372582 A1* | 12/2014 | Ghanwani | H04L 45/745 709/223 |
| 2015/0009992 A1* | 1/2015 | Zhang | H04L 12/4633 370/392 |
| 2015/0026292 A1* | 1/2015 | Cochran | H04L 67/10 709/217 |
| 2015/0063102 A1 | 3/2015 | Mestery et al. | |
| 2015/0063360 A1* | 3/2015 | Thakkar | H04L 49/70 370/400 |
| 2015/0098320 A1 | 4/2015 | Natarajan et al. | |
| 2015/0281067 A1 | 10/2015 | Wu | |
| 2015/0350081 A1* | 12/2015 | DeCusatis | H04L 47/12 370/235 |
| 2015/0381495 A1* | 12/2015 | Cherian | H04L 61/2592 370/392 |
| 2016/0087885 A1* | 3/2016 | Tripathi | H04W 76/12 370/389 |
| 2016/0285734 A1* | 9/2016 | Dempo | H04L 67/10 |
| 2016/0294769 A1 | 10/2016 | Song et al. | |
| 2016/0381015 A1* | 12/2016 | Ravinutala | H04L 63/0272 726/7 |
| 2017/0017907 A1* | 1/2017 | Narasimhan | G06Q 10/063 |
| 2017/0026355 A1* | 1/2017 | Mathaiyan | G06F 9/5072 |
| 2017/0031710 A1* | 2/2017 | Kuik | G06F 3/064 |
| 2017/0093636 A1* | 3/2017 | Chanda | H04L 45/72 |
| 2017/0099188 A1* | 4/2017 | Chang | H04L 63/20 |
| 2017/0339070 A1* | 11/2017 | Chang | H04L 47/829 |
| 2018/0006943 A1* | 1/2018 | Dubey | H04L 47/24 |
| 2018/0115519 A1* | 4/2018 | Bonomi | H04L 63/0428 |
| 2018/0241824 A1* | 8/2018 | He | H04L 12/4641 |

FOREIGN PATENT DOCUMENTS

| | | |
|---|---|---|
| CN | 104115453 A | 10/2014 |
| CN | 105208048 A | 12/2015 |
| CN | 105283879 A | 1/2016 |
| CN | 105591925 A | 5/2016 |
| CN | 106656719 A | 5/2017 |
| EP | 2966815 A1 | 1/2016 |
| WO | 2015144033 A1 | 10/2015 |

OTHER PUBLICATIONS

Foreign Communication From a Counterpart Application, Chinese Application No. 17852247.0, Partial Supplementary European Search Report dated Sep. 27, 2019, 7 pages.
Foreign Communication From a Counterpart Application, Chinese Application No. 201610851070.7, Chinese Office Action dated May 8, 2019, 9 pages.
Bicakci, M., "TCP-Freeze: Beneficial for Virtual Machine Live Migration with IP Address Change?," XP032253291, Aug. 27, 2012, pp. 136-141.
Machine Translation and Abstract of Chinese Publication No. CN103368807, Oct. 23, 2013, 24 pages.
Machine Translation and Abstract of Chinese Publication No. CN105208048, Dec. 30, 2015, 35 pages.
Machine Translation and Abstract of Chinese Publication No. CN105591925, May 18, 2016, 18 pages.
Machine Translation and Abstract of Chinese Publication No. CN106656719, May 10, 2017, 27 pages.
Foreign Communication From a Counterpart Application, PCT Application No. PCT/CN2017/095911, English Translation of International Search Report dated Oct. 26, 2017, 2 pages.
Foreign Communication From a Counterpart Application, PCT Application No. PCT/CN2017/095911, English Translation of Written Opinion dated Oct. 26, 2017, 7 pages.

* cited by examiner

INTER-CLOUD COMMUNICATION METHOD AND RELATED DEVICE, AND INTER-CLOUD COMMUNICATION CONFIGURATION METHOD AND RELATED DEVICE

CROSS-REFERENCE TO RELATED APPLICATIONS

This application is a continuation of International Patent Application No. PCT/CN2017/095911 filed on Aug. 4, 2017, which claims priority to Chinese Patent Application No. 201610851070.7 filed on Sep. 26, 2016. The disclosures of the aforementioned applications are hereby incorporated by reference in their entireties.

TECHNICAL FIELD

This application relates to the field of inter-cloud communication technologies to an inter-cloud communication method and a related device, and an inter-cloud communication configuration method and a related device.

BACKGROUND

A tenant may request a cloud service provider to create a cloud platform. The cloud service provider uses a large quantity of general server units to form a resource pool in order to provide an integrated cloud platform including computing, storage, networking, and the like for the tenant. The tenant does not need to focus on implementation details of the cloud platform, but only needs to impose requirements on the platform in aspects such as a scale of computing, a capacity of storage, a manner of interconnecting computing and storage resources using a network. A cloud management system of the cloud service provider can generate a corresponding cloud platform based on the requirements, and provide the corresponding cloud platform for the tenant.

To ensure security and stability of the cloud platform, the cloud platform is generally deployed in a plurality of clouds. In this way, when one cloud fails to provide a service due to irresistible factors, computing and storage resources on the other clouds can be used, thereby avoiding a case in which the cloud platform is faulty and unavailable.

The cloud platform is deployed across the clouds such that a technical solution is needed for implementing communication between the plurality of clouds.

SUMMARY

This application provides an inter-cloud communication method, used to implement communication between virtual machines (also referred to as VM) deployed in different clouds.

To achieve the foregoing disclosure objective, this application provides the following technical solutions.

According to a first aspect, an embodiment of this application provides an inter-cloud communication method, used to send a data packet of a first virtual machine to a second virtual machine, where the first virtual machine and the second virtual machine are located in different clouds, the first virtual machine and a first virtual switch are deployed on a first computing node, and the second virtual machine and a second virtual switch are deployed on a second computing node. The method includes determining, by the first virtual switch after receiving the data packet of the first virtual machine, that a first-hop node of the data packet is a gateway node (also referred to as GW) in a cloud in which the second virtual machine is located, sending, by the first virtual switch, the data packet to the gateway node through a tunnel between the first computing node and the gateway node, determining, by the gateway node after receiving the data packet, that a second-hop node of the data packet is the second computing node, sending, by the gateway node, the data packet to the second computing node through a tunnel between the gateway node and the second computing node, and sending, by the second virtual switch deployed on the second computing node, the data packet to the second virtual machine. In this embodiment, the data packet for inter-cloud communication only passes through the two hops of nodes the gateway node in the cloud in which the virtual machine that receives the data packet is located and the computing node on which the virtual machine that receives the data packet is located. Therefore, in this embodiment, a communication path is relatively short, and communication efficiency is relatively high.

In a possible design, determining, by the first virtual switch after receiving the data packet of the first virtual machine, that a first-hop node of the data packet is a gateway node in a cloud in which the second virtual machine is located includes determining, by the first virtual switch based on a destination address of the data packet and a pre-generated first forwarding relationship table, the gateway node corresponding to the destination address as the first-hop node after receiving the data packet of the first virtual machine, where the first forwarding relationship table is used to indicate a correspondence between the second virtual machine and the gateway node in the cloud in which the second virtual machine is located. In this implementation, the virtual switch determines the first-hop node of the data packet using the forwarding relationship table, and such a determining manner is simple and easy to implement.

In a possible design, determining, by the gateway node after receiving the data packet, that a second-hop node of the data packet is the second computing node includes determining, by the gateway node based on a destination address of the data packet and a pre-generated second forwarding relationship table, the second computing node corresponding to the destination address as the second-hop node after receiving the data packet, where the second forwarding relationship table is used to indicate a correspondence between the second virtual machine and the computing node on which the second virtual machine is located. In this implementation, the gateway node also uses the forwarding relationship table to determine the second-hop node of the data packet such that such a determining manner is simple and easy to implement.

In a possible design, the tunnel between the first computing node and the gateway node is established after the first virtual switch receives the data packet of the first virtual machine. The tunnel between the gateway node and the second computing node is established after the gateway node receives the data packet. In this implementation, the tunnel is established only when there is a service requirement such that tunnel resources can be saved.

According to another aspect, an embodiment of this application provides an inter-cloud communication configuration method, including instructing, by the first switch agent module, a first network controller or a network coordinator to send connectivity information of the first virtual machine to a first gateway agent module if a first switch agent module detects that a first virtual machine that is connected to a first virtual switch is online, where the connectivity information includes an address of the first virtual machine and an address of a computing node on which the first virtual machine is located, configuring, by the first gateway agent module, a forwarding relationship table for a first gateway node based on the connectivity information, where the first virtual machine and the first gateway node are deployed in a first cloud, modifying, by the network coordinator, the connectivity information, and sending the modified connectivity information to a second switch agent module, where the modified connectivity information includes the address of the first virtual machine and an address of the first gateway node, and configuring, by the second switch agent module, a forwarding relationship table for a second virtual switch based on the modified connectivity information, where the second switch agent module and the second virtual switch are deployed in a second cloud. In this embodiment, the forwarding relationship tables can be configured for the gateway node and the virtual switch, and the forwarding relationship tables can be used to implement sending of a data packet in a cloud to another cloud using two hops of nodes.

In a possible design, after configuring, by the first gateway agent module, a forwarding relationship table for a first gateway node based on the connectivity information, the configuration method further includes establishing, by the first gateway node, a tunnel between the first gateway node and a computing node on which the first switch agent module is located, and after configuring, by the second switch agent module, a forwarding relationship table for a second switch based on the modified connectivity information, the configuration method further includes establishing, by a computing node on which the second switch agent module is located, a tunnel between the computing node and the first gateway node. In this implementation, the tunnel is established before sending of service data such that sending efficiency of the service data can be improved.

In a possible design, sending, by the network coordinator, the modified connectivity information to a second switch agent module includes sending, by the network coordinator, the modified connectivity information to a second network controller, and storing, by the second network controller, the modified connectivity information, and sending the modified connectivity information to the second switch agent module. In this implementation, the second network controller can store the connectivity information. Therefore, after a virtual machine is newly created in the cloud in which the virtual machine that receives the data packet is located, the switch agent module reads the connectivity information, and generates the forwarding relationship table for the virtual switch.

If the second switch agent module detects that the second virtual switch is connected to a second virtual machine, and detects that no forwarding relationship table is configured on the second virtual switch, the second switch agent module reads the modified connectivity information from the second network controller, and configures the forwarding relationship table for the second virtual switch based on the modified connectivity information. In this implementation, after a virtual machine is newly created in the cloud in which the virtual machine that receives the data packet is located, the switch agent module can read the connectivity information, and generate the forwarding relationship table for the virtual switch.

In a possible design, after the first switch agent module detects that the first virtual machine is connected to the first virtual switch, the configuration method further includes reading, by the first switch agent module from the first network controller, virtual network information of a virtual port that is connected to the first virtual machine, generating a flow table record based on the virtual network information, and delivering the flow table record to the first virtual switch. In this way, the virtual switch can use the flow table to forward the data packet.

According to still another aspect, an embodiment of this application provides an inter-cloud communication system, where the system has a function of implementing the foregoing inter-cloud communication method. The function may be implemented by hardware, or may be implemented by executing corresponding software by hardware. The hardware or the software includes one or more modules corresponding to the foregoing function.

According to yet another aspect, an embodiment of this application provides an inter-cloud communication configuration system, where the system has a function of implementing the foregoing inter-cloud communication configuration method. The function may be implemented by hardware, or may be implemented by executing corresponding software by hardware. The hardware or the software includes one or more modules corresponding to the foregoing function.

According to still yet another aspect, this application provides a computing node, including a processor and a memory, where the processor runs a software program stored in the memory and invokes data stored in the memory to perform at least the following steps of determining that a next-hop node of the data packet is a gateway node in a cloud in which a virtual machine that receives the data packet is located after generating a data packet, and sending the data packet to the gateway node through a tunnel between the computing node and the gateway node.

According to a further aspect, this application provides a gateway node, including a processor and a memory, where the processor runs a software program stored in the memory and invokes data stored in the memory to perform at least the following steps of determining that a next-hop node of the data packet is a computing node on which a virtual machine that receives the data packet is located after receiving a data packet, and sending the data packet to the computing node through a tunnel between the gateway node and the computing node.

BRIEF DESCRIPTION OF DRAWINGS

To describe the technical solutions in some of the embodiments of this application more clearly, the following briefly describes the accompanying drawings describing some of the embodiments. The accompanying drawings in the following description show merely the embodiments of this application, and a person of ordinary skill in the art may still derive other drawings from these accompanying drawings without creative efforts.

DESCRIPTION OF EMBODIMENTS

For ease of understanding, application scenarios in this application are first described.

A cloud service provider can construct a corresponding cloud platform based on a request of a tenant. To ensure security and stability of the cloud platform, the cloud platform is usually deployed across clouds, and this can prevent a fault of one cloud from causing unavailability of the entire cloud platform.

The cloud platform includes Virtual Machines (VMs) and a virtual network. The VMs, as computing and storage resources and the like, can provide services such as computing and storage. The VMs are deployed in a plurality of clouds, and communicate with each other across the clouds using the virtual network.

Currently, there are mainly the following several solutions for implementing interworking between the plurality of clouds.

Figure 1:
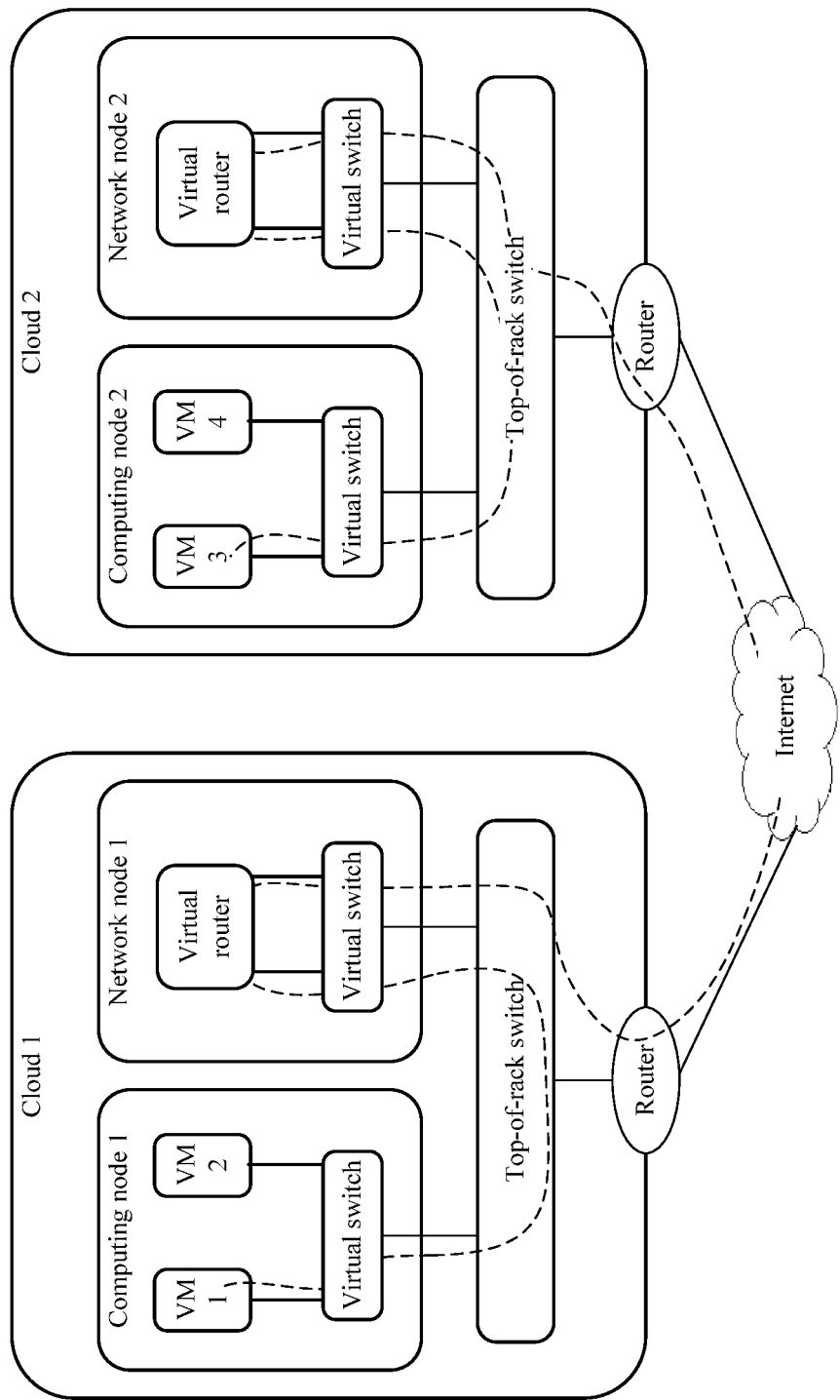
FIG. 1 and FIG. 2 are diagrams of two inter-cloud communication methods.

In a first solution shown in FIG. 1, a cloud 1 and a cloud 2 interwork with each other through the Internet. When a VM 1 in the cloud 1 and a VM 3 in the cloud 2 communicate with each other, a data packet of the VM 1 needs to enter the Internet through a Virtual Router (vRouter), reach a vRouter in the cloud 2 through the Internet, and then reach a VM 3 through the vRouter.

This interworking solution has at least two disadvantages. The first disadvantage is inability to achieve high availability, because this solution requires forwarding by a vRouter and is a Layer 3 interworking manner. However, high availability requires two communication parties to be in a same Layer 2 network. The second disadvantage is relatively high communication costs. A data packet needs to be forwarded using the Internet, and therefore a public Internet Protocol (IP) address is needed. However, to reduce costs, VMs in a cloud usually use private addresses. If a public IP address that charges higher bandwidth fees is applied, communication costs are inevitably increased.

Figure 2:
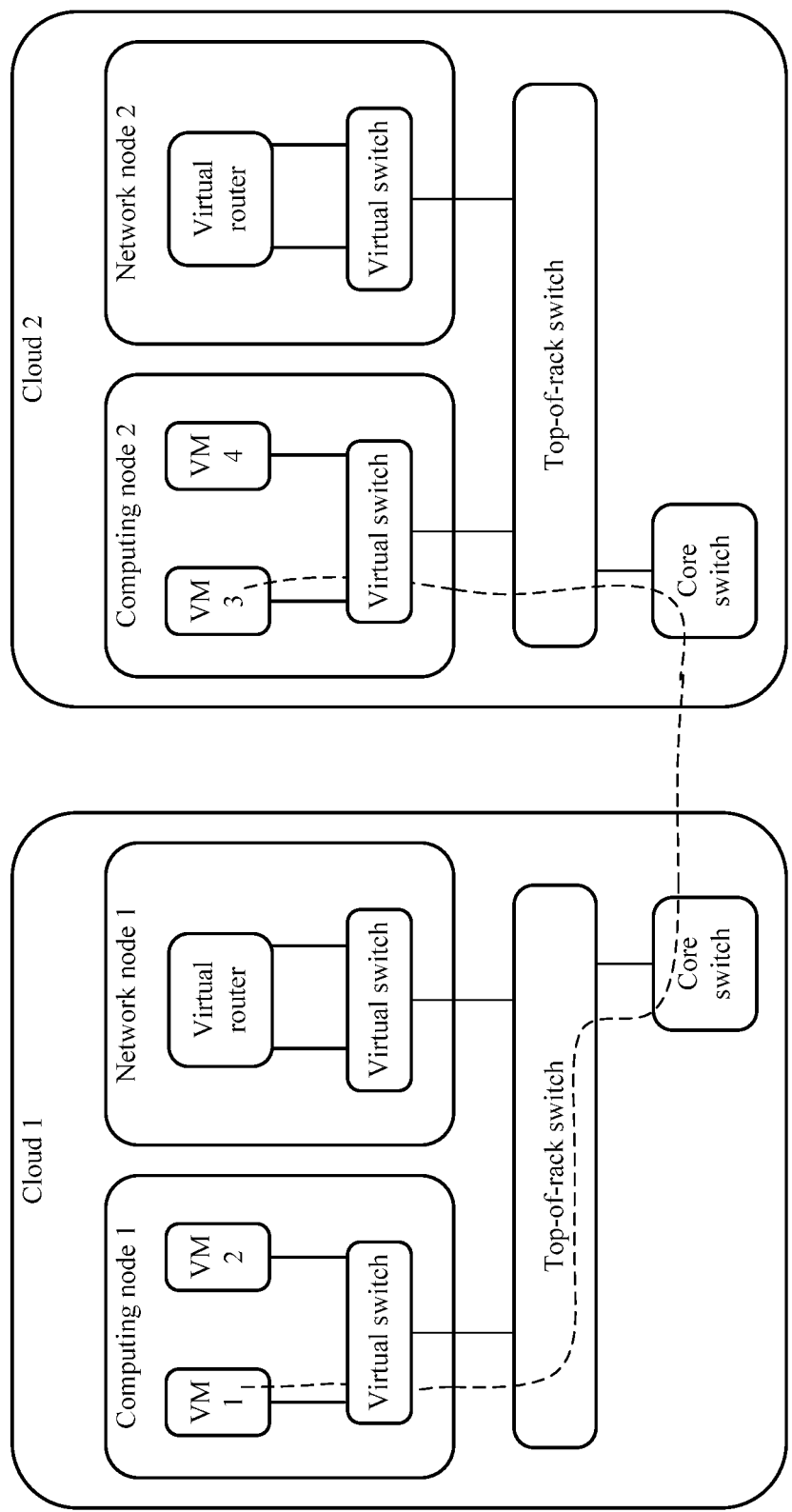

In a second solution shown in FIG. 2, a tunnel is established between a computing node 1 in a cloud 1 and a computing node 2 in a cloud 2. When a VM 1 on the computing node 1 and a VM 3 on the computing node 2 communicate with each other, a data packet of the VM 1 directly reaches the VM 3 through the tunnel.

This interworking solution also has at least two disadvantages. The first disadvantage is that too many tunnels need to be established. A computing node on which a VM is located needs to establish tunnels with computing nodes on which all VMs that communicate with the VM are located. For example, if the VM 1 further needs to communicate with a VM 5, and the VM 5 is located on another computing node such as a computer node 3, the computer node 1 further needs to establish a tunnel with the computer node 3. The second disadvantage is that once a location of a VM in a cloud changes, the other clouds need to perceive the location change, and a new tunnel needs to be established. For example, if the VM 1 is migrated from the computing node 1 to the computing node 3, a tunnel between the computer node 3 and the computer node 1 needs to be established.

It can be learned that the two existing inter-cloud interworking solutions have disadvantages in aspects such as costs and efficiency. In view of this, this application provides an inter-cloud communication method, to overcome the disadvantages in the existing inter-cloud communication solutions.

Figure 3:
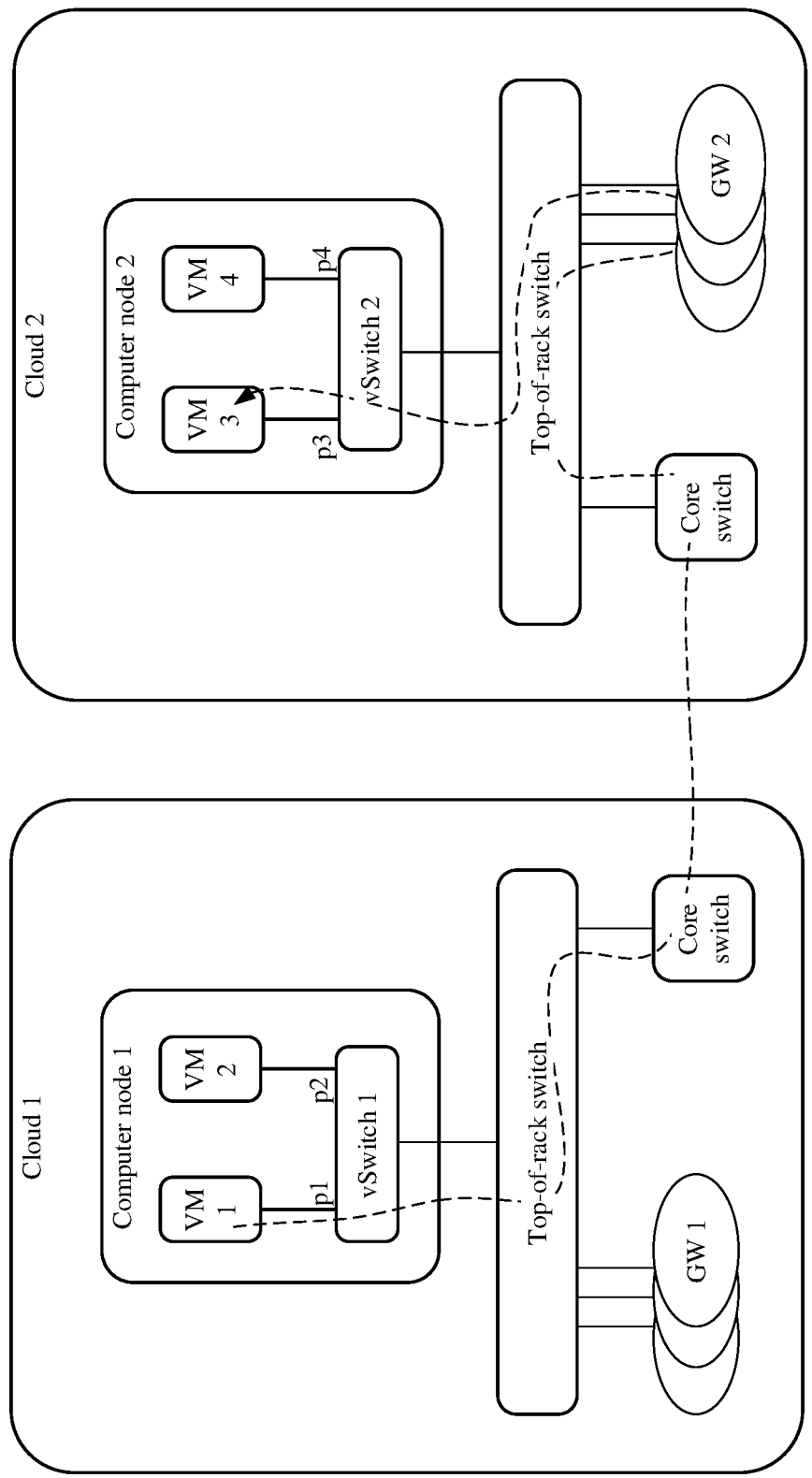
FIG. 3 is a structural diagram of a system for communication from a VM 1 to a VM 3 according to this application.

Referring to FIG. 3, FIG. 3 shows a schematic structural diagram of an inter-cloud communication system according to this application. As shown in FIG. 3, the inter-cloud communication system is configured to implement communication between a cloud 1 and a cloud 2, communication between a VM 1 in the cloud 1 and a VM 3 in the cloud 2. It should be noted that the cloud 1 and the cloud 2 in this application are two different clouds. Computing, storage, and networking resources and the like are deployed in the clouds. Each cloud has a respective cloud management system to manage resources in the cloud of the cloud management system. The cloud management system may include various management modules such as a network controller in this application. Different cloud management systems have different network addresses and domain names. Therefore, different clouds can be defined depending on the network addresses and the domain names of the cloud management systems.

A computer node 1 and a GW 1 are deployed in the cloud 1, a vSwitch 1, the VM 1, and a VM 2 are configured on the computer node 1, and the VM 1 and the VM 2 are connected to the vSwitch 1. A computer node 2 and a GW 2 are deployed in the cloud 2, a vSwitch 2, the VM 3, and a VM 4 are configured on the computer node 2, and the VM 3 and the VM 4 are connected to the vSwitch 2.

It should be noted that both the GW 1 and the GW 2 are gateway nodes, both the computer node 1 and the computer node 2 are computing nodes, both the vSwitch 1 and the vSwitch 2 are virtual switches, and the VM 1 to the VM 4 are virtual machines. To implement communication between the clouds, other network devices, such as a Top-of-Rack Switch (also referred to as TOR) and a Core Switch (also referred to as CORE), are further deployed in the clouds. These network devices are existing devices, and details are not described.

The VM 1 and the VM 3 belong to a virtual network, and can communicate with each other, and the VM 2 and the VM 4 belong to another virtual network, and can communicate with each other. In this application, communication between the VM 1 and the VM 3 is used as an example for description. For a process of communication between the VM 2 and the VM 4, refer to the following description, and details are not described.

Figure 4:
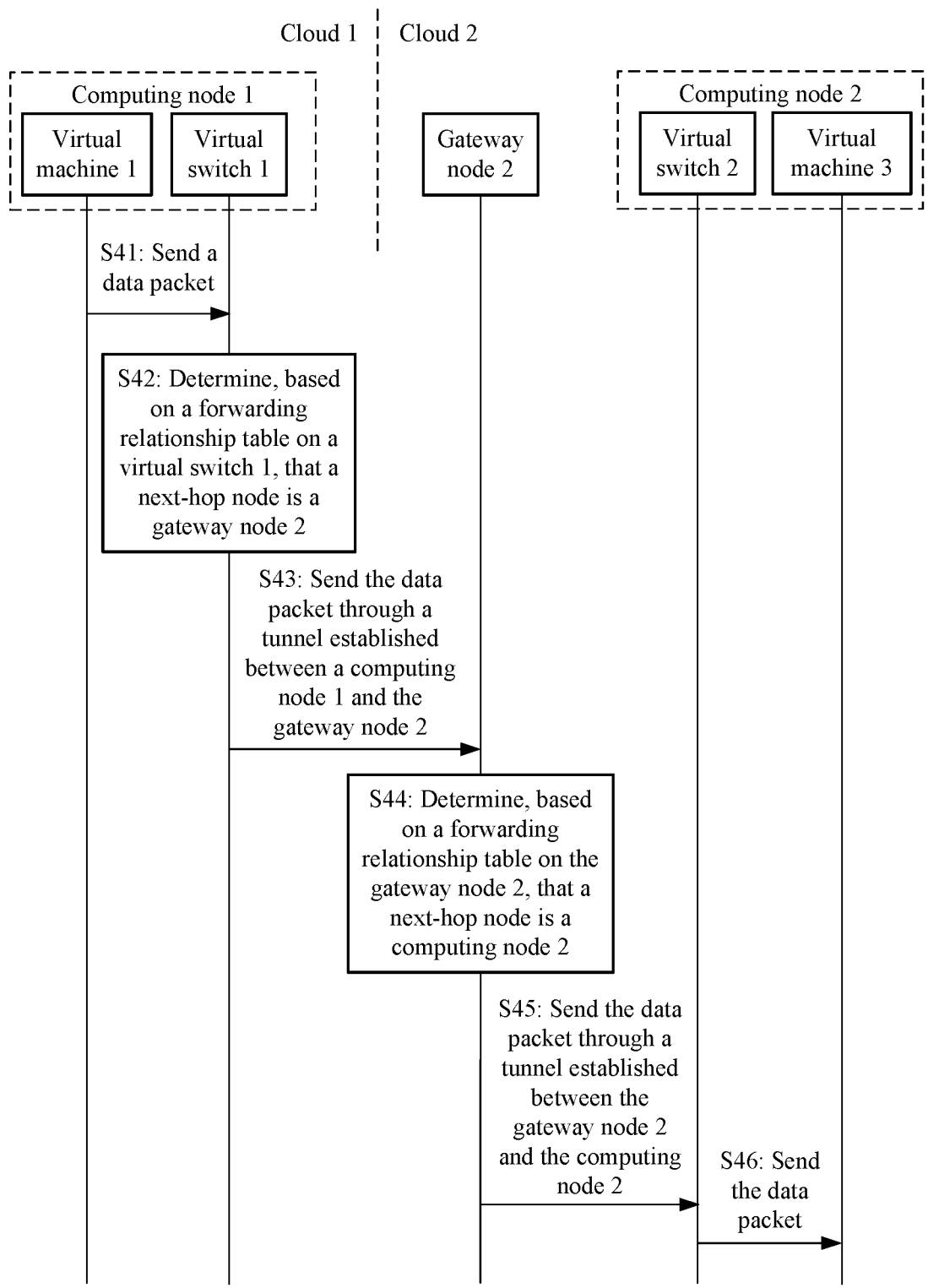
FIG. 4 is a flowchart of a method for communication from a VM 1 to a VM 3 according to this application.

Referring to FIG. 4, FIG. 4 shows a communication procedure in which a virtual machine 1 sends a data packet to a virtual machine 3, including the following steps S41 to S46.

Step S41: On a computing node 1, the virtual machine 1 sends a data packet to a virtual switch 1.

The virtual machine 1 and the virtual switch 1 are configured on a same computing node, as shown in FIG. 3, configured on the computing node 1. The virtual switch 1 has a virtual port, the virtual machine 1 has a virtual network interface card, and the virtual port is bound to the virtual network interface card through configuration such that the virtual machine 1 is connected to the virtual switch 1. In this way, the data packet sent by the virtual machine 1 is sent to the virtual switch 1 through the virtual port.

It should be noted that the data packet sent by the virtual machine 1 is a data packet to be sent to the virtual machine 3, and then the data packet carries a destination Media Access Control (MAC) address, that is, a physical address MAC3 of the virtual machine 3.

Step S42: The virtual switch 1 determines, based on a forwarding relationship table on the virtual switch 1, that a next-hop node is a gateway node 2.

The forwarding relationship table is stored on the virtual switch 1. To distinguish the forwarding relationship table on the virtual switch 1 from a forwarding relationship table on another node, the forwarding relationship table may be referred to as a first forwarding relationship table.

The forwarding relationship table is used to indicate a correspondence between a destination address and the next-hop node. That is, the forwarding relationship table may be used to indicate that the data packet to be sent to the destination address is sent to the next-hop node. Therefore, the next-hop node of the data packet can be determined based on the forwarding relationship table and the destination MAC address.

A cloud in which the destination MAC address and the next-hop node are located is different from a cloud in which the virtual switch 1 is located in order to implement communication between different clouds. The next-hop node may be a gateway node in another cloud other than the cloud in which the virtual switch 1 is located.

For example, the forwarding relationship table on the virtual switch 1 includes (MAC3, vTepM), where MAC3 is an address of a VM 3 in FIG. 3, and vTepM is an address of the next-hop node, that is, the GW 2 in FIG. 4. Therefore, after receiving the data packet to be sent to the VM 3, the virtual switch 1 determines, based on the forwarding relationship table and the destination address MAC3, that the address of the next-hop node is vTepM, and then can determine that the data packet needs to be sent to the GW 2.

Step S43: The virtual switch 1 sends the data packet to the gateway node 2 through a tunnel established between the computing node 1 and the gateway node 2.

The tunnel is established between the computing node 1 on which the virtual switch 1 is located and the gateway node 2, and the tunnel may be established in two manners. In a first manner, the tunnel is established when the virtual switch 1 determines, after receiving the data packet, that the data packet needs to be sent to the gateway node 2. In a second manner, the tunnel is established in a process of inter-cloud communication configuration. For details, refer to a procedure shown in FIG. 7A and FIG. 7B. In the first manner, the tunnel is established only when there is a requirement for a data sending service such that tunnel resources can be saved, and in the second manner, the tunnel is established before there is a data sending service such that data sending efficiency can be improved.

Tunneling is an overlay technology, which is overlaying an existing network with a software-defined logic network. The logic network on the existing network is defined such that service logic is implemented, and physical decoupling is also implemented. The tunneling is a network encapsulation technology that constructs a Layer 2 network in a Layer 3/Layer 4 packet for transfer. A specific application form of the tunnel may be a virtual extensible local area network (VXLAN). The VXLAN uses a MAC in User Datagram Protocol (UDP) method to encapsulate a data packet, thereby providing a capability of overlaying a Layer 4 network with the Layer 2 network.

The tunnel is established between the computing node 1 and the gateway node 2, and the virtual switch 1 is configured on the computing node 1 such that the data packet sent by the virtual switch 1 to the gateway node 2 can be sent to the gateway node 2 through the tunnel.

Step S44: The gateway node 2 determines, based on a forwarding relationship table on the gateway node 2, that a next-hop node is a computing node 2.

The forwarding relationship table is stored on the gateway node 2, and the forwarding relationship table may be referred to as a second forwarding relationship table.

The forwarding relationship table is used to indicate a correspondence between the destination address and the next-hop node. The destination address and the next-hop node are located in a same cloud, the next-hop node may be a computing node on which the destination address is located.

The next-hop node of the data packet can be determined based on the forwarding relationship table and the destination address, and the next-hop node is the computing node in a cloud in which the destination address is located.

For example, the forwarding relationship table on the gateway node 2 includes (MAC3, vTep3), where MAC3 is the address of the VM 3 in FIG. 3, and vTep3 is an address of the next-hop node, that is, a computer node 2 in FIG. 4. Therefore, after receiving the data packet to be sent to the VM 3, the gateway node 2 determines, based on the forwarding relationship table and the destination address MAC3, that the address of the next-hop node is vTep3, and then can determine that the data packet needs to be sent to the computer node 2.

Step S45: The gateway node 2 sends the data packet to the computing node 2 through a tunnel established between the gateway node 2 and the computing node 2.

The tunnel is established between the gateway node 2 and the computing node 2, referring to the description of step S43. The tunnel is established in two manners, and details are not described again. The data packet to be sent to the virtual machine 3 can be sent to the computing node 2 through the tunnel. The data packet may be sent to a virtual switch 2 on the computing node 2.

Step S46: On the computing node 2, a virtual switch 2 sends the data packet to the virtual machine 3.

Referring to FIG. 3, the virtual switch 2 and the virtual machine 3 are configured on the computing node 2. The virtual machine 3 is connected to the virtual switch 2 using a virtual port p3, and a correspondence between the virtual machine 3 and the virtual port p3 is recorded in a flow table on the virtual switch 2. Therefore, it can be determined, based on the flow table, that the data packet to be sent to the virtual machine 3 needs to be sent through the virtual port p3.

The foregoing communication procedure is a procedure in which the virtual machine 1 in the cloud 1 sends a data packet to the virtual machine 3 in the cloud 2. For a path of the data packet, refer to a dashed line in FIG. 3.

For ease of description, the cloud in which the destination address (the virtual machine 3) of the data packet is located is referred to as a receive end cloud, and the cloud in which the virtual machine 1 that sends the data packet is located is referred to as a transmit end cloud.

Compared with the method shown in FIG. 1, in this procedure, a data packet is sent to a next-hop node through a tunnel, where tunneling refers to overlaying a Layer 3 network with a Layer 2 network. Based on this, application can achieve high availability. In addition, the virtual machine in the cloud does not need to use a public IP address, and communication costs are relatively low.

Compared with the method shown in FIG. 2, in this procedure, a gateway in the receive end cloud is used as an entrance to external communication, a virtual machine that sends a data packet only needs to establish a tunnel with the gateway in the receive end cloud, and the data packet to be sent to the virtual machine in the receive end cloud only needs to be sent to the gateway. In this way, a quantity of tunnels can be reduced, and when a location of the virtual machine in the receive end cloud changes, the virtual machine that sends the data packet does not need to perceive the location change.

In addition, in this procedure, the data packet directly reaches the gateway node in the receive end cloud, without passing through a gateway node in the transmit end cloud. In this way, communication between virtual machines in any two clouds requires only two hops of nodes, a communication path is relatively short, and communication efficiency is relatively high.

In the foregoing procedure, sending a data packet by the virtual machine 1 to the virtual machine 3 can be implemented. A procedure in which the virtual machine 3 sends a data packet to the virtual machine 1 is similar to the foregoing procedure. Similarly, the data packet also passes through two hops of nodes. A first-hop node is a gateway node in the cloud in which the virtual machine 1 is located, and a second-hop node is a computing node on which the virtual machine 1 is located. The communication path is relatively short.

It should be noted that the two hops of nodes in this application are not network nodes such as a router and a gateway that are in a Layer 3 network architecture, but are two hops of nodes in an application scenario of a Layer 2 virtual network. In this application scenario, a tunnel is established in the Layer 2 virtual network, and a node to which a data packet is sent through the tunnel is a node to which the data packet hops.

For example, in FIG. 3, a tunnel is established between the computing node 1 and the gateway node 2, a data packet is sent to the gateway node 2 through the tunnel, and therefore the gateway node 2 is a first-hop node, and a tunnel is established between the gateway node 2 and the computing node 2, the data packet is sent to the computing node 2 through the tunnel, and therefore the computing node 2 is a second-hop node. It can be learned that the two hops of nodes in this application are associated with the two tunnels, and are different from network nodes generally meant in a Layer 3 network.

A forwarding relationship table (MAC1, vTepN) is stored on the virtual switch 2 in the computing node on which the virtual machine 3 is located, MAC1 is a physical address of the virtual machine 1, and vTepN is an address of the gateway node in the cloud in which the virtual machine 1 is located. A forwarding relationship table (MAC1, vTep1) is stored on the gateway node GW 1, and vTep1 is an address of the computing node in the cloud in which the virtual machine 1 is located. It should be noted that vTep1, vTep2, vTepN, vTepM, and the like in this application all are VXLAN Tunnel End Point (vTep) addresses.

Figure 5:
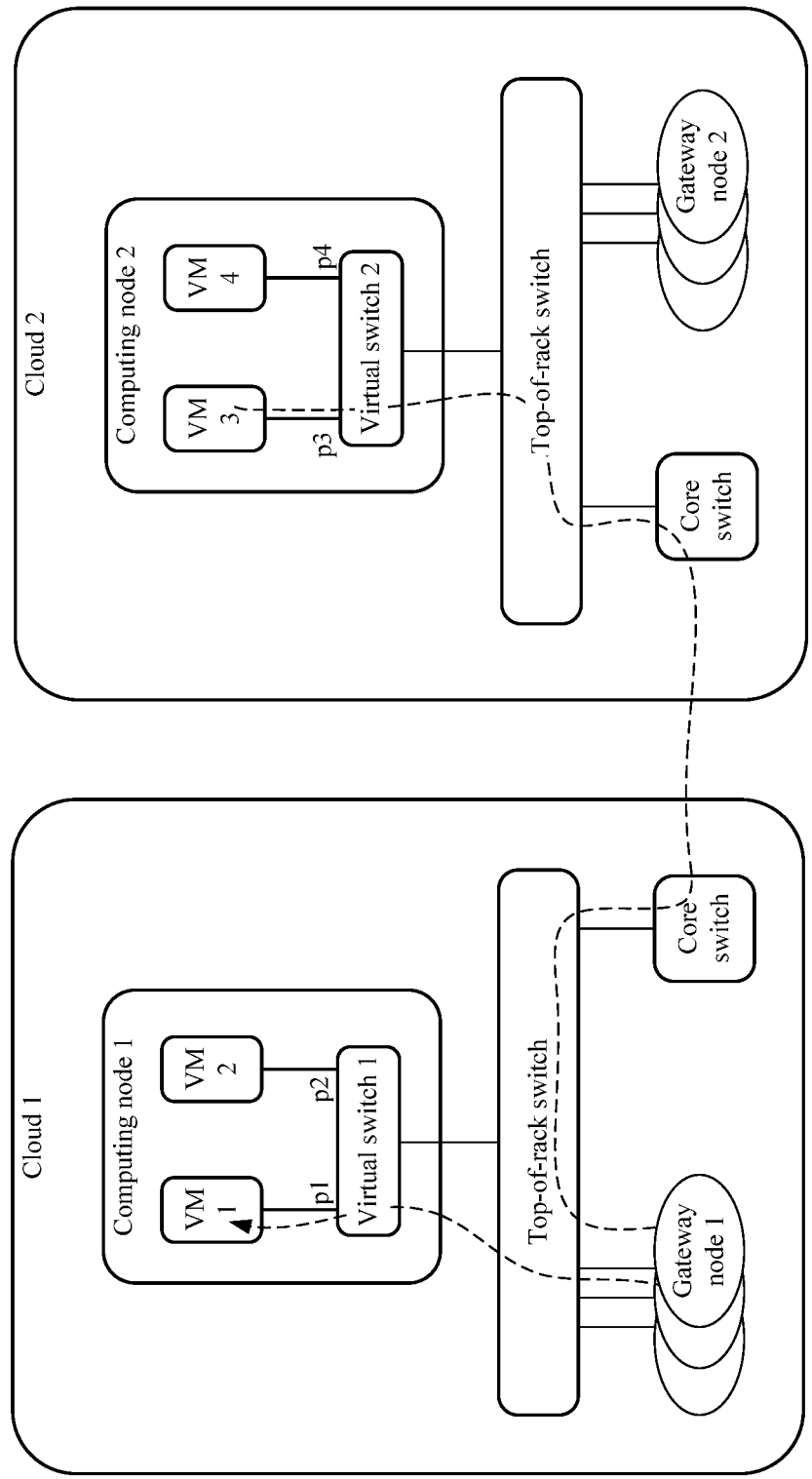
FIG. 5 is a structural diagram of a system for communication from a VM 3 to a VM 1 according to this application.

A dashed line shown in FIG. 5 indicates a path along which the VM 3 sends a data packet to the VM 1. The MAC1 is a physical address of the VM 1, vTepN is an address of the GW 1, and vTep1 is an address of the computer node 1. The vSwitch 2 sends, based on a forwarding relationship table, the data packet to the GW 1 through a tunnel between the computer node 2 and the GW 1. The GW 1 sends, based on a forwarding relationship table, the data packet to the computer node 1 through a tunnel between the GW 1 and the computer node 1, and the vSwitch 1 in the computer node 1 sends the data packet to the VM 1.

It should be noted that, for a process of communication between other virtual machines that are located in different clouds and that belong to a same network, refer to the foregoing procedure. As shown in FIG. 3 and FIG. 5, for a procedure in which the VM 2 in the cloud 1 sends a data packet to the VM 4 in the cloud 2, refer to the procedure in which the VM 1 sends a data packet to the VM 3. For a procedure in which the VM 4 sends a data packet to the VM 2, refer to the procedure in which the VM 3 sends a data packet to the VM 1.

The procedure of communication between the plurality of clouds provided in this application can be applied to various cloud environment management platforms, such as OpenStack, and CloudStack.

To implement communication between the foregoing plurality of clouds, this application further provides an inter-cloud communication configuration procedure, to implement configuration of a forwarding relationship table required in a communication process and establishment of a tunnel.

Figure 6A:
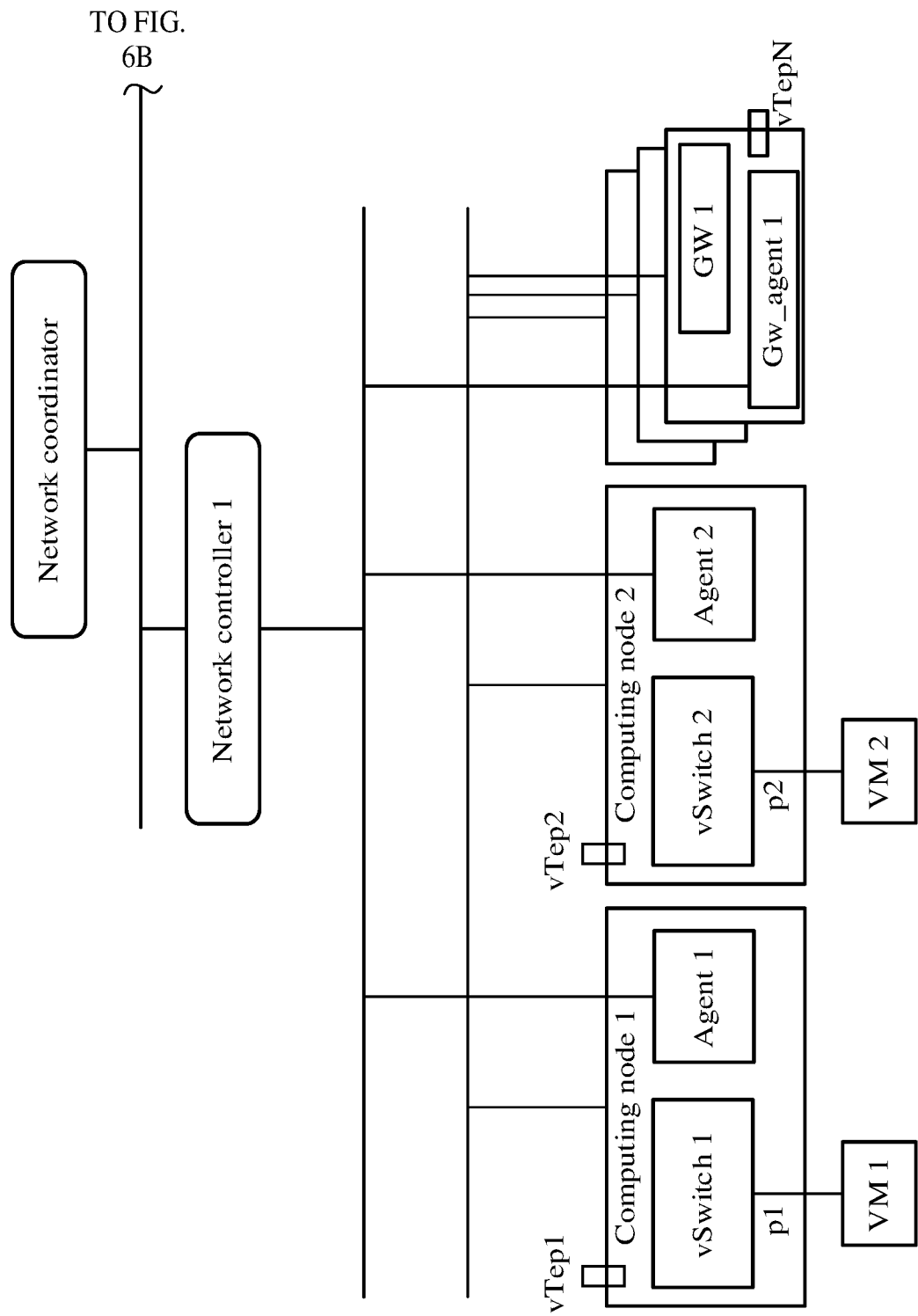
FIG. 6A and FIG. 6B are a structural diagram of an inter-cloud communication configuration system according to this application.
Figure 6B:
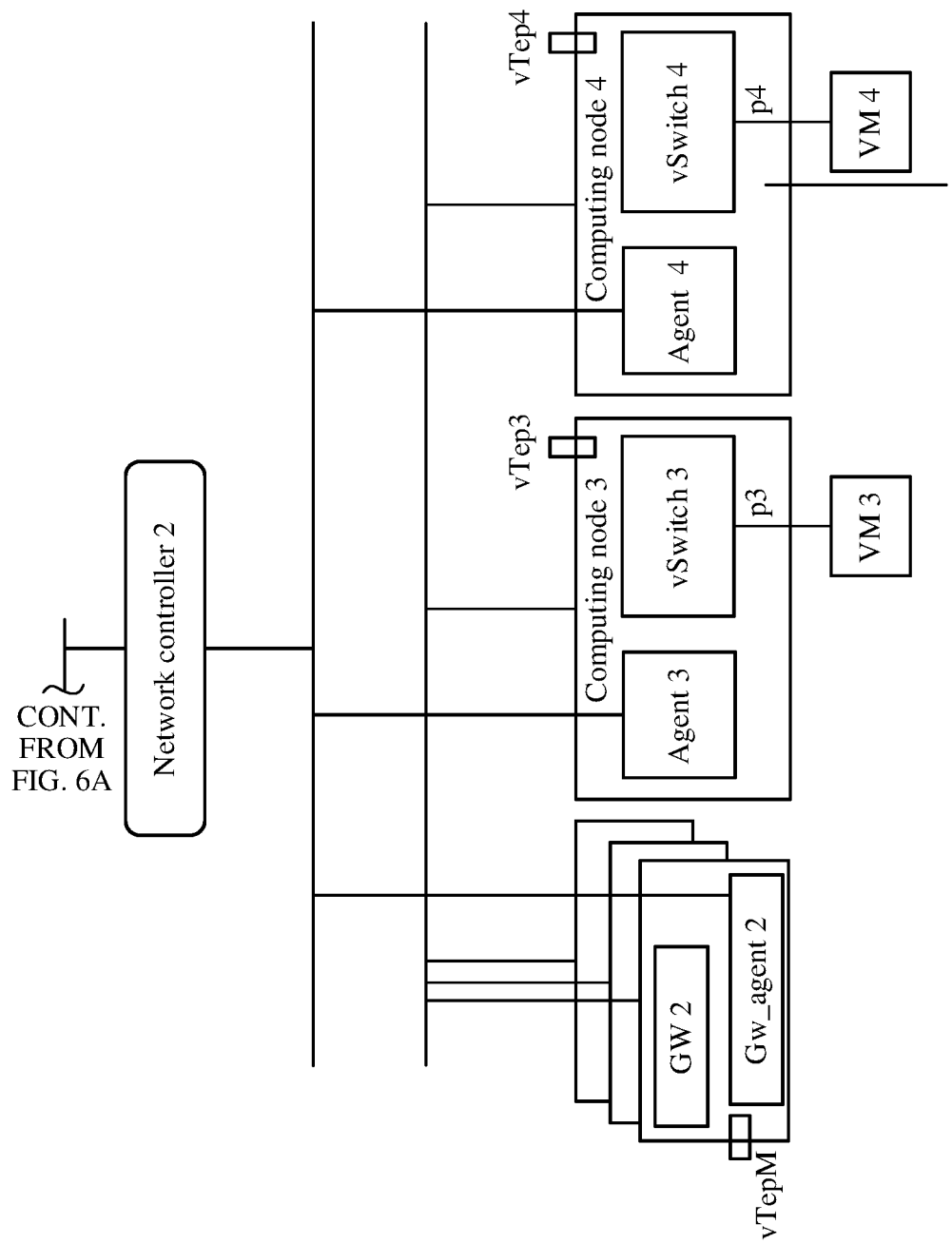

Referring to FIG. 6A and FIG. 6B, FIG. 6A and FIG. 6B show a schematic structural diagram of an inter-cloud communication configuration system according to this application. The system includes a network coordinator, a network controller 1, a network controller 2, an agent 1, an agent 3, a gw_agent 1, and a gw_agent 2.

The network controller 1, the agent 1 and the gw_agent 1 are deployed in a cloud 1, and the network controller 2, the agent 3 and the gw_agent 2 are deployed in a cloud 2. The network coordinator may be deployed in the cloud 1, or may be deployed in the cloud 2. Further, the network coordinator may be arranged together with the network controller 1 in a same physical server or physical server cluster, or may be arranged together with the network controller 2 in a same physical server or physical server cluster.

The agent 1 is deployed on a computing node on which a vSwitch 1 is located, the computing node may be referred to as a computing node 1, and an address of the computing node is vTep1. The agent 3 is deployed on a computing node on which a vSwitch 3 is located, the computing node may be referred to as a computing node 3, and an address of the computing node is vTep3.

A VM 1 may further be created on the computing node 1, and the VM 1 is connected to the vSwitch 1. A VM 3 may further be created on the computing node 3, and the VM 3 is connected to the vSwitch 3.

After configuration by the system, cross-cloud communication between the VM 1 and the VM 3 can be implemented. In addition, the communication process requires only two hops, and a communication path is relatively short.

For ease of understanding, the network controller 1 and the network controller 2 are network controllers, the switch agent module 1 and the switch agent module 3 are switch agent modules, the gateway agent 1 and the gateway agent 2 are gateway agent modules, the virtual switch 1 and the virtual switch 3 are virtual switches, and the VM 1 and the VM 3 are virtual machines.

Based on the system having the foregoing structure, this application provides an inter-cloud communication configuration procedure. For details about the configuration procedure, refer to FIG. 7A and FIG. 7B, including steps S701 to S712.

Step S701: A switch agent module 1 monitors configuration information of a virtual switch 1.

The switch agent module 1 is the agent 1 shown in FIG. 6A, and the virtual switch 1 is the vSwitch 1. The switch agent module 1 and the virtual switch 1 are configured on a same computing node, and the switch agent module 1 is configured to monitor and configure the virtual switch 1.

One aspect of content to be monitored is the configuration information of the virtual switch. A virtual port may be configured on the virtual switch. Adding, removing, or changing a virtual port may cause a change in the configuration information.

The virtual port is configured to connect virtual machines, and virtual ports of different virtual switches may belong to a same virtual network. In this way, virtual machines that are connected to these virtual ports can communicate with each other. If these virtual switches are located in different clouds, cross-cloud communication between the virtual machines can be implemented. The virtual machines that communicate across the clouds are the VM 1 and the VM 3, or the VM 2 and the VM 4 that are shown in FIG. 6A and FIG. 6B.

Step S702: If the switch agent module 1 detects that a virtual port of the virtual switch 1 is connected to a virtual machine 1, the switch agent module 1 reads, from a network controller 1, virtual network information of the virtual port.

It is assumed that, a virtual network 1 is created in a cloud management system, and the virtual network is deployed across the cloud 1 and the cloud 2, includes the vSwitch 1 in the cloud 1 and the vSwitch 3 in the cloud 2 that are shown in FIG. 6A and FIG. 6B. In addition, a virtual machine may be created in the cloud management system, and the virtual machine is connected to the virtual switch. FIG. 6A and FIG. 6B are still used as an example. It is assumed that, a VM 1 is created in the cloud management system, and a network coordinator 1 is invoked to create a virtual port p1 on the vSwitch 1, and bind a virtual network interface card of the VM 1 to the virtual port p1, thereby implementing a connection between the VM 1 and the vSwitch 1.

When the VM 1 is connected to the vSwitch 1, a change in the configuration information of the vSwitch 1 is caused. The agent 1 can detect the change such that the agent 1 reads, from a network controller 1, the virtual network information of the virtual port.

Step S703: The switch agent module 1 generates, based on the virtual network information, a flow table record, and delivers the flow table record to the virtual switch 1.

The virtual network information may include an identifier of the virtual port, an identifier of the virtual network to which the virtual port belongs, and an address of the virtual machine to which the virtual port is connected. After a correspondence is established among the foregoing three, a flow table record is obtained, and then is delivered to the virtual switch 1. As shown in FIG. 6A, the virtual port connected to the VM 1 is p1, the identifier of the virtual network to which p1 belongs is 100, the address of the VM 1 is MAC1, and therefore the generated flow table record is p1-100-MAC1.

The virtual switch 1 may use a flow table to forward a data packet, or add the identifier of the virtual network to the sent data packet.

Step S704: The switch agent module 1 notifies the network controller 1 that the virtual port is online.

The network controller 1 is the network controller 1 in FIG. 6A. That the virtual port is online indicates that the virtual machine may send a data packet to the virtual switch using the virtual port. The virtual machine has a binding relationship with the virtual port of the virtual switch. That the virtual port is online may indicate that the virtual machine that is bound to the virtual port is online. For example, in FIG. 6A, the virtual machine VM 1 is bound to the virtual port p1 of the virtual switch vSwitch 1, and that p1 is online indicates that the VM 1 is online.

Step S705: The network controller 1 sends connectivity information (VNI, MAC, vTep) of the virtual port to a gateway agent module 1.

The network controller 1 may forward a notification that the virtual port is online to a network coordinator. Therefore, another implementation of sending the connectivity information to the gateway agent module 1 is sending, by the network coordinator, the connectivity information (VNI, MAC, vTep) of the virtual port to the gateway agent module 1.

The connectivity information includes the identifier VNI of the virtual network to which the virtual port belongs, the address MAC of the virtual machine to which the virtual port is connected, and an address vTep of a computing node on which the virtual port is located. As shown in FIG. 6A, the connectivity information of the virtual port p1 may include (100, MAC1, vTep1).

As described above, the virtual machine has a binding relationship with the virtual port of the virtual switch such that the connectivity information of the virtual port may also be considered as connectivity information of the virtual machine that is bound to the virtual port. For example, in FIG. 6A, the connectivity information of the virtual port p1 may also be considered as the connectivity information of the virtual machine VM 1.

Step S706: The gateway agent module 1 configures, based on the connectivity information (VNI, MAC, vTep), a forwarding relationship table on a gateway node 1.

The gateway agent module 1 is the gw_agent 1 in FIG. 6A, and the gateway node 1 is the GW 1. The gateway agent module is configured to manage the gateway node, the gateway node managed by the gateway agent module 1 is the gateway node 1, and the gateway agent module 1 and the gateway node 1 may be deployed in a same gateway cluster.

The gateway agent module 1 generates a forwarding relationship table (MAC, vTep) from a correspondence between MAC and vTep that are in the connectivity information, and the forwarding relationship table may be used as a basis for forwarding a data packet by the gateway node 1. After receiving the data packet whose destination address is MAC, the gateway node 1 can determine, based on the forwarding relationship table, that a next-hop node of the data packet is a computing node indicated by vTep.

For example, in a procedure shown in FIG. 5 in which the VM 3 sends a data packet to the VM 1, a forwarding relationship table (MAC1, vTep1) is stored on the GW 1. After receiving the data packet to be sent to the VM 1, the GW 1 determines, based on the destination address MAC1 of the data packet, that a next-hop node of the data packet is a computer node 1 indicated by vTep1.

Step S707: The gateway node 1 establishes a tunnel with a computing node on which the switch agent module 1 is located.

After receiving the connectivity information, the gateway agent module 1 can trigger the gateway node to establish the tunnel with the computing node on which the switch agent module 1 is located. For example, in FIG. 6A, the GW 1 establishes a tunnel with the computer node 1 on which the agent 1 is located.

If the computing node on which the switch agent module 1 is located is the next-hop node, the gateway node 1 can directly send the data packet through the established channel to the computing node on which the switch agent module 1 is located.

Step S708: The network controller 1 sends the connectivity information (VNI, MAC, vTep) of the virtual port to a network coordinator.

Step S709: The network coordinator modifies the connectivity information (VNI, MAC, vTep) into (VNI, MAC, vTep'), and sends the (VNI, MAC, vTep') to a network controller 2.

After receiving the connectivity information sent by the network controller 1, the network coordinator modifies the address vTep that is of the computing node on which the virtual port is located and that is in the connectivity information into vTep'. The vTep' is an address of the gateway node 1 such that the gateway node 1 is used as an interface for external communication.

For an example, in FIG. 6A and FIG. 6B, the network coordinator modifies the connectivity information (100, MAC1, vTep1) into (100, MAC1, vTepN), and then sends the (100, MAC1, vTepN) to a network controller 2.

Step S710: The network controller 2 sends the modified connectivity information to a switch agent module 3.

It should be noted that, in steps S709 and S710, the modified connectivity information is sent to the switch agent module 3 using the network controller 2. Alternatively, the connectivity information may be directly sent by the network coordinator to the switch agent module 3. In the former implementation, the network controller 2 can store the connectivity information. In this case, if a virtual machine is newly created in a cloud in which the network controller 2 is located, and the virtual machine is connected to the virtual port of the virtual switch, the switch agent module that manages the virtual switch first determines whether a forwarding relationship table is configured on the virtual switch. If no forwarding relationship table is configured on the virtual switch, the switch agent module reads the modified connectivity information from the network controller 2, and performs step S711, that is, configures a forwarding relationship table on the virtual switch.

It should be noted that there is not only one switch agent module 3, but instead there may be a plurality of switch agent modules 3 depending on an actual situation.

Step S711: The switch agent module 3 configures a forwarding relationship table on a virtual switch 3 based on the modified connectivity information.

The switch agent module 3 is the agent 3 in FIG. 6B, and the virtual switch 3 is the vSwitch 3 in FIG. 6B. The switch agent module and the virtual switch are on a same computing node, the switch agent module is configured to manage the virtual switch, and a module managed by the switch agent module 3 is the virtual switch 3.

The switch agent module 3 generates a forwarding relationship table (MAC, vTep') from a correspondence between MAC and vTep' that are in the connectivity information, and the forwarding relationship table may be used as a basis for forwarding the data packet by the virtual switch 3. After receiving the data packet whose destination address is MAC, the virtual switch 3 can determine, based on the forwarding relationship table, that the next-hop node of the data packet is the gateway node indicated by vTep'.

For example, in this procedure shown in FIG. 5 in which the VM 3 sends a data packet to the VM 1, a forwarding relationship table (MAC1, vTepN) is stored on the vSwitch 3. After receiving the data packet to be sent to the VM 1, the vSwitch 3 determines, based on the destination address MAC1 of the data packet, that a next-hop node of the data packet is the GW 1 indicated by vTepN.

Step S712: A computing node on which the switch agent module 3 is located establishes a tunnel with the gateway node 1.

After receiving the modified connectivity information, the switch agent module 3 can trigger the computing node on which the switch agent module 3 is located to establish a tunnel between the computing node and the gateway node 1. For example, in FIG. 6A and FIG. 6B, the computing node 3 on which the agent 3 is located establishes a tunnel with the GW 1.

If the gateway node 1 is the next-hop node, the virtual switch 3 can directly send the data packet to the gateway node 1 through the tunnel.

It can be learned from the foregoing configuration procedure that the inter-cloud communication system after configuration can implement the procedure shown in FIG. 5 in which the virtual machine 3 sends a data packet to the virtual machine 1. The data packet sent by the virtual machine 3 first reaches, through the tunnel established in step S712, the gateway node 1 based on the forwarding relationship table configured in step S711, then reaches, through the tunnel established in step S707, the computing node 1 based on the forwarding relationship table configured in step S706, and is sent by the virtual switch 1 in the computing node 1 to the virtual machine 1. The communication procedure requires only two hops, and a communication path is relatively short.

In the foregoing configuration procedure, monitoring the virtual switch 1 by the switch agent module 1 is used as an example for description. A procedure in which the switch agent module 3 monitors the virtual switch 3 is the same as the foregoing configuration procedure. Details about the procedure are not described, and the following describes only several pieces of data related to the procedure that are different from those in FIG. 7A and FIG. 7B.

For example, in FIG. 6A and FIG. 6B, in the latter configuration procedure, a created virtual machine is the VM 3, and also belongs to a virtual network 100. A physical address of the VM 3 is MAC3, a virtual port of the vSwitch 3 to which the VM 3 is connected is p3, and a flow table record configured on the vSwitch 3 is p3-100-MAC3.

Connectivity information sent by the network controller 2 to the agent 3 includes (100, MAC3, vTep3), a forwarding relationship table configured on the GW 2 is (MAC3, vTep3), and the GW 2 establishes a tunnel with the computer node 3.

The network coordinator modifies the connectivity information (100, MAC3, vTep3) into (100, MAC3, vTepM), and sends the (100, MAC3, vTepM) to the network controller 1. A forwarding relationship table configured on the vSwitch 1 is (MAC3, vTepM). The computing node 1 on which the vSwitch 1 is located establishes a tunnel with the GW 2.

Figure 8:
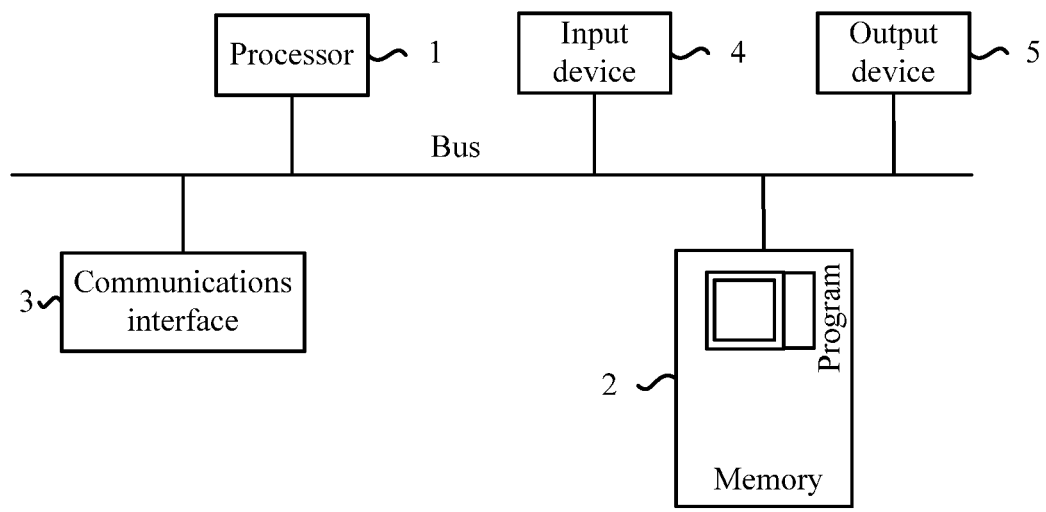
FIG. 8 is a schematic diagram of a general framework of a computer according to this application.

Referring to FIG. 8, FIG. 8 is a possible schematic structural diagram of a computing node/gateway node, including a bus, a controller/processor 1, a memory 2, a communications interface 3, an input device 4, and an output device 5. The processor 1, the memory 2, the communications interface 3, the input device 4 and the output device 5 are connected to each other using the bus.

The bus may include a channel to transfer information between various components of a computer system.

The controller/processor 1 may be a general purpose processor, for example, a general purpose central processing unit (CPU), a network processor (NP), or a microprocessor, or may be an application-specific integrated circuit (ASIC), or one or more integrated circuits configured to control program execution in solutions of the present disclosure. The controller/processor 1 may alternatively be a digital signal processor (DSP), an ASIC, a field programmable gate array (FPGA) or another programmable logical device, a discrete gate or transistor logic device, a discrete hardware component, or the like. The controller/processor 1 may alternatively be a combination implementing a computing function, for example, a combination including one or more microprocessors, or a combination of a DSP and a microprocessor.

Figure 7A:
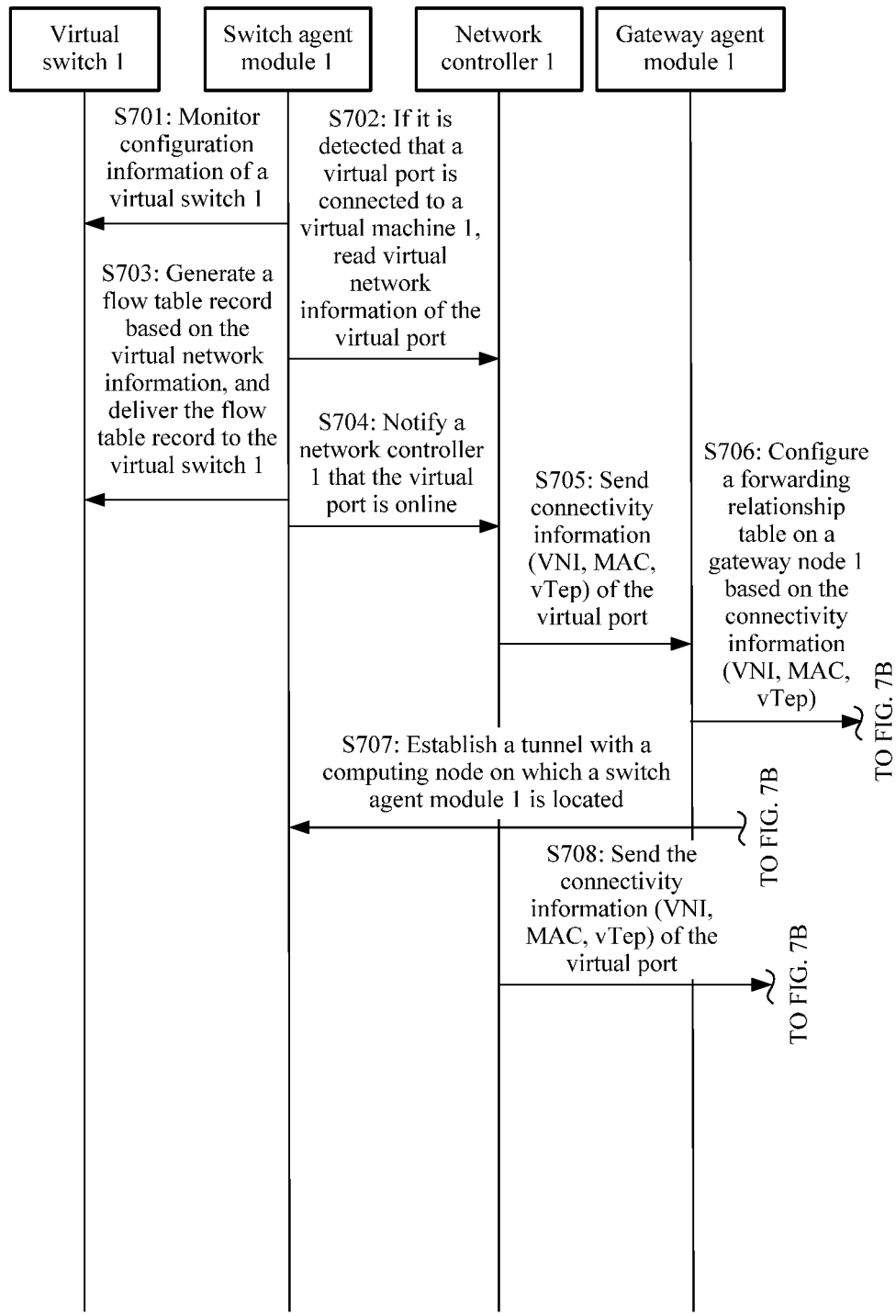
FIG. 7A and FIG. 7B are a flowchart of an inter-cloud communication configuration method according to this application.
Figure 7B:
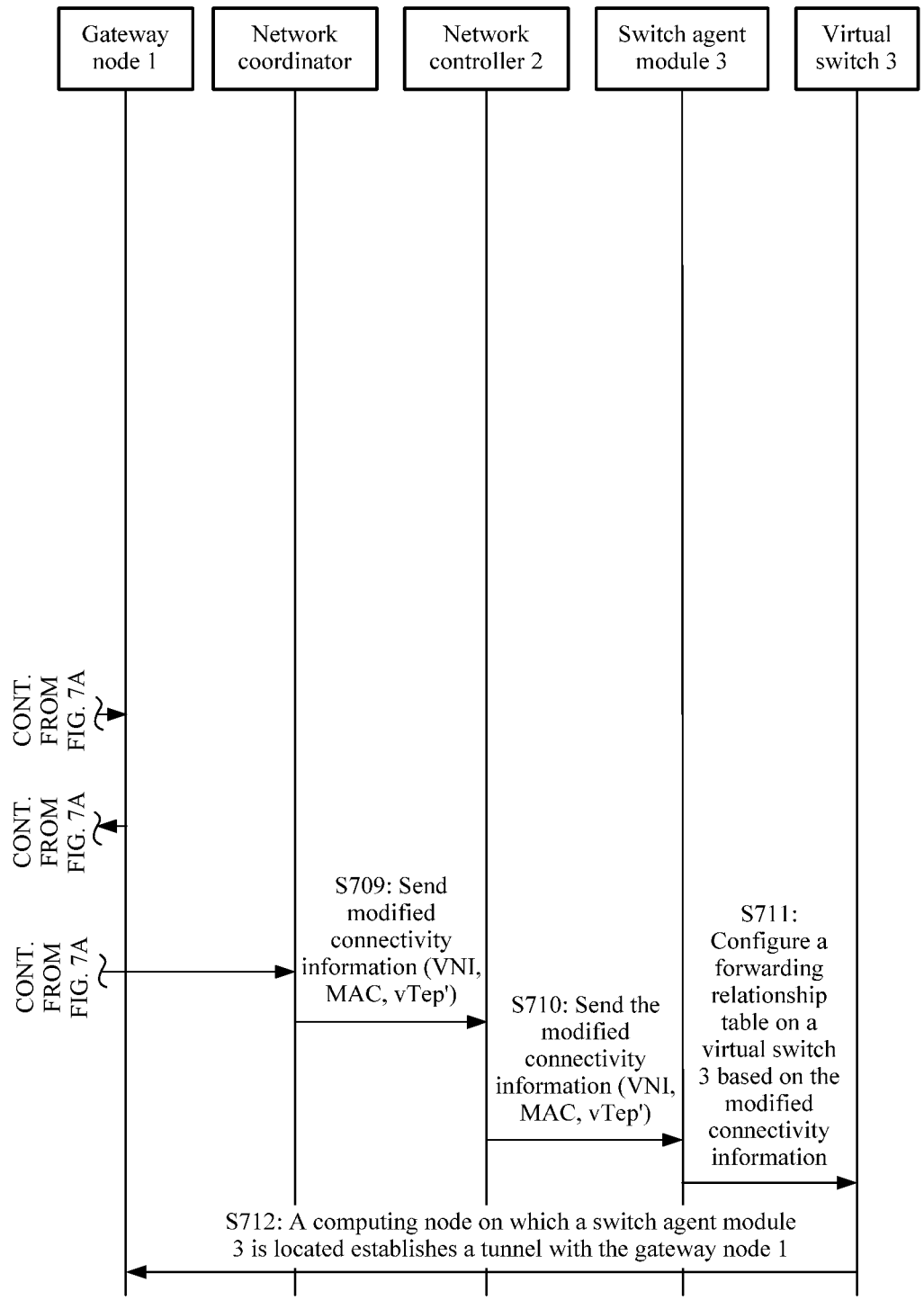

The controller/processor 1 of the computing node may be configured to perform a processing procedure related to a computing node 1 in FIG. 4 and a processing procedure related to a virtual switch 1 and a switch agent module 1 in FIG. 7A and FIG. 7B, and/or may be configured to perform other processes of technologies described in this application.

The controller/processor 1 of the gateway node may be configured to perform a processing process related to the gateway node 2 in FIG. 4, and/or may be configured to perform other processes of technologies described in this application.

The memory 2 stores a program executing technical solutions of this application, and may also store an operating system or another application. The program may include program code. The program code includes a computer operating instruction. The memory 2 may be a read-only memory (ROM), another type of static storage device capable of storing static information and an instruction, a random access memory (RAM), another type of dynamic storage device capable of storing information and an instruction, a magnetic disk storage, or the like.

The communications interface 3 may use any apparatus such as a transceiver, to communicate with another device or another communications network, such as Ethernet, a radio access network (RAN), or a wireless local area network (WLAN).

The input device 4 may include an apparatus such as a keyboard, a mouse, a camera, a scanner, a light pen, a voice input apparatus, or a touchscreen that receives data and information that are entered by a user.

The output device 5 may include an apparatus such as a display, a printer, or a speaker that allows information to be output to a user.

Method or algorithm steps described in combination with the content disclosed in the present disclosure may be implemented by hardware, or may be implemented by a processor by executing a software instruction. The software instruction may be formed by a corresponding software module. The software module may be located in a RAM memory, a flash memory, a ROM memory, an erasable programmable ROM (EPROM), an electrically EPROM (EEPROM), a register, a hard disk, a removable hard disk, a compact disc ROM (CD-ROM), or a storage medium of any other form known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may alternatively be located in user equipment. Certainly, the processor and the storage medium may exist in the user equipment as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. An inter-cloud communication method, used to send a data packet of a first virtual machine to a second virtual machine, the inter-cloud communication method comprising:

receiving, by a first virtual switch, the data packet, wherein the first virtual machine and the second virtual machine are located in different cloud systems, and wherein the first virtual machine and the first virtual switch are deployed on a first computing node;

determining, by the first virtual switch, that a first-hop node of the data packet is a second gateway node in a cloud system in which the second virtual machine is located;

sending, by the first virtual switch, the data packet to the second gateway node through a first tunnel between the first computing node and the second gateway node;

receiving, by the second gateway node, the data packet;

determining, by the second gateway node, that a second-hop node of the data packet is a second computing node;

sending, by the second gateway node, the data packet to the second computing node through a second tunnel between the second gateway node and the second computing node; and sending, by a second virtual switch deployed on the second computing node, the data packet to the second virtual machine.

2. The inter-cloud communication method of claim 1, wherein determining that the first-hop node of the data packet is the second gateway node comprises determining, by the first virtual switch based on a destination address of the data packet and a pre-generated first forwarding relationship table, the second gateway node corresponding to the destination address as the first-hop node, and wherein the pre-generated first forwarding relationship table indicates a correspondence between the second virtual machine and the second gateway node in the cloud system in which the second virtual machine is located.

3. The inter-cloud communication method of claim 1, wherein determining that the second-hop node of the data packet is the second computing node comprises determining, by the second gateway node based on a destination address of the data packet and a pre-generated second forwarding relationship table, the second computing node corresponding to the destination address as the second-hop node, and wherein the pre-generated second forwarding relationship table indicates a correspondence between the second virtual machine and the second computing node on which the second virtual machine is located.

4. The inter-cloud communication method of claim 1, further comprising establishing, by the first computing node, the first tunnel between the first computing node and the second gateway node after the first virtual switch receives the data packet.

5. The inter-cloud communication method of claim 1, further comprising establishing, by the second gateway node, the second tunnel between the second gateway node and the second computing node after the second gateway node receives the data packet.

6. The inter-cloud communication method of claim 1, further comprising:
    detecting, by a first switch agent apparatus, that the first virtual machine coupled to the first virtual switch is online;
    instructing, by the first switch agent apparatus, a network coordinator to send connectivity information of the first virtual machine to a first gateway agent apparatus, wherein the connectivity information comprises an address of the first virtual machine and an address of a computing node on which the first virtual machine is located;
    configuring, by the first gateway agent apparatus, a forwarding relationship table for a first gateway node based on the connectivity information, wherein the first virtual machine and the first gateway node are deployed in a first cloud system;
    modifying, by the network coordinator, the connectivity information to obtain modified connectivity information;
    sending, by the network coordinator, the modified connectivity information to a second switch agent apparatus, wherein the modified connectivity information comprises the address of the first virtual machine and an address of the first gateway node; and
    configuring, by the second switch agent apparatus, a forwarding relationship table for a second virtual switch based on the modified connectivity information, wherein the second switch agent apparatus and the second virtual switch are deployed in a second cloud system.

7. The inter-cloud communication method of claim 6, wherein after configuring the forwarding relationship table for the first gateway node, the inter-cloud communication method further comprises establishing, by the first gateway node, a first tunnel between the first gateway node and a computing node on which the first switch agent apparatus is located.

8. The inter-cloud communication method of claim 6, wherein after configuring the forwarding relationship table for the second virtual switch, the inter-cloud communication method further comprises establishing, by a computing node on which the second switch agent apparatus is located, a second tunnel between the computing node and the first gateway node.

9. The inter-cloud communication method of claim 6, wherein sending the modified connectivity information to the second switch agent apparatus comprises:
    sending, by the network coordinator, the modified connectivity information to a second network controller;
    storing, by the second network controller, the modified connectivity information; and
    sending, by the second network controller, the modified connectivity information to the second switch agent apparatus.

10. The inter-cloud communication method of claim 9, further comprising:
    detecting, by the second switch agent apparatus, that the second virtual machine coupled to the second virtual switch is online, and the forwarding relationship table for second virtual switch is not configured;
    reading, by the second switch agent apparatus, the modified connectivity information from the second network controller; and
    configuring, by the second switch agent apparatus, the forwarding relationship table for the second virtual switch based on the modified connectivity information.

11. The inter-cloud communication method of claim 6, wherein after the first switch agent apparatus detects that the first virtual machine is coupled to the first virtual switch, the inter-cloud communication method further comprises:
    reading, by the first switch agent apparatus from a first network controller, virtual network information of a virtual port coupled to the first virtual machine;
    generating, by the first switch agent apparatus, a flow table record based on the virtual network information; and
    delivering, by the first switch agent apparatus, the flow table record to the first virtual switch.

12. An inter-cloud communication system, used to send a data packet of a first virtual machine to a second virtual machine, wherein the first virtual machine and the second virtual machine are located in different cloud systems, and wherein the inter-cloud communication system comprises:
    a second gateway node in a cloud system in which the second virtual machine is located;
    a first computing node coupled to the second gateway node, wherein a first virtual switch and the first virtual machine are deployed on the first computing node; and
    a second computing node coupled to the second gateway node, wherein a second virtual switch and the second virtual machine are deployed on the second computing node,
    wherein the first virtual switch is configured to:
        receive the data packet;
        determine that a first-hop node of the data packet is the second gateway node; and
        send the data packet to the second gateway node through a first tunnel between the first computing node and the second gateway node,
    wherein the second gateway node is configured to:
        receive the data packet from the first virtual switch;
        determine that a second-hop node of the data packet is the second computing node; and
        send the data packet to the second computing node through a second tunnel between the second gateway node and the second computing node, and
    wherein the second virtual switch is configured to send the data packet to the second virtual machine.

13. The inter-cloud communication system of claim 12, wherein after receiving the data packet, the first virtual switch is further configured to determine, based on a destination address of the data packet and a pre-generated first forwarding relationship table, the second gateway node corresponding to the destination address as the first-hop node, and wherein the pre-generated first forwarding relationship table indicates a correspondence between the second virtual machine and the second gateway node in the cloud system in which the second virtual machine is located.

14. The inter-cloud communication system of claim 12, wherein after receiving the data packet, the second gateway node is further configured to determine, based on a destination address of the data packet and a pre-generated second forwarding relationship table, the second computing node corresponding to the destination address as the second-hop node, and wherein the pre-generated second forwarding relationship table indicates a correspondence between the second virtual machine and the computing node on which the second virtual machine is located.

15. The inter-cloud communication system of claim 12, further comprising:
a first switch agent apparatus configured to:
detect that the first virtual machine coupled to a first virtual switch is online; and
instruct a network coordinator to send connectivity information of the first virtual machine to a first gateway agent apparatus, wherein the connectivity information comprises an address of the first virtual machine and an address of a computing node on which the first virtual machine is located,
wherein the first gateway agent apparatus is configured to configure a forwarding relationship table for the first gateway node based on the connectivity information, wherein the first virtual machine and the first gateway node are deployed in a first cloud system,
wherein the network coordinator is configured to:
modify the connectivity information to obtain modified connectivity information; and
send the modified connectivity information to a second switch agent apparatus, wherein the modified connectivity information comprises the address of the first virtual machine and an address of the first gateway node, and
wherein the second switch agent apparatus is configured to configure a forwarding relationship table for a second virtual switch based on the modified connectivity information, and wherein the second switch agent apparatus and the second virtual switch are deployed in a second cloud: system.

16. The inter-cloud communication system of claim 15, wherein the first gateway node is configured to establish a first tunnel between the first gateway node and a computing node on which the first switch agent apparatus is located.

17. The inter-cloud communication system of claim 15, further comprising a computing node on which the second switch agent apparatus is located and configured to establish a second tunnel between the computing node and the first gateway node.

18. The inter-cloud communication system of claim 15, further comprising a second network controller coupled to the network coordinator, wherein the network coordinator is configured to send the modified connectivity information to the second network controller, and wherein the second network controller is configured to:
store the modified connectivity information; and
send the modified connectivity information to the second switch agent apparatus.

19. The inter-cloud communication system of claim 18, wherein the second switch agent apparatus is further configured to:
detect that the second virtual machine coupled to the second virtual switch is online;
detect that a forwarding relationship table for the second virtual switch is not configured;
read the modified connectivity information from the second network controller; and
configure the forwarding relationship table for the second virtual switch based on the modified connectivity information.

20. The inter-cloud communication system of claim 15, wherein the first switch agent apparatus is further configured to:
read, from a first network controller, virtual network information of a virtual port coupled to the first virtual machine;
generate a flow table record based on the virtual network information; and
deliver the flow table record to the first virtual switch.

* * * * *